(12) United States Patent
Ju et al.

(10) Patent No.: US 10,411,375 B2
(45) Date of Patent: Sep. 10, 2019

(54) METHOD FOR MOLDING ELECTRICAL CONNECTOR

(71) Applicant: LOTES CO., LTD, Keelung (TW)

(72) Inventors: Ted Ju, Keelung (TW); Wen Wei Lin, Keelung (TW); Li Ming Zhang, Keelung (TW)

(73) Assignee: LOTES CO., LTD, Keelung (TW)

( * ) Notice: Subject to any disclaimer, the term of this patent is extended or adjusted under 35 U.S.C. 154(b) by 259 days.

(21) Appl. No.: 15/679,454

(22) Filed: Aug. 17, 2017

(65) Prior Publication Data

US 2017/0346206 A1 Nov. 30, 2017

Related U.S. Application Data

(63) Continuation of application No. 14/621,134, filed on Feb. 12, 2015, now Pat. No. 10,008,793.

(Continued)

(51) Int. Cl.
*H01R 12/71* (2011.01)
*H01R 24/78* (2011.01)
(Continued)

(52) U.S. Cl.
CPC ........... *H01R 12/712* (2013.01); *B29C 63/00* (2013.01); *H01R 12/00* (2013.01); *H01R 12/707* (2013.01);
(Continued)

(58) Field of Classification Search
CPC .. H01R 13/405; H01R 13/504; H01R 13/518; H01R 13/6585; H01R 12/712; H01R 12/00; H01R 12/707; H01R 13/6477; H01R 13/6594; H01R 43/18; H01R 2107/00; B29C 63/00
(Continued)

(56) References Cited

U.S. PATENT DOCUMENTS 9,231,356 B1* 1/2016 Ju ........................... H01R 24/78
9,461,412 B2* 10/2016 Yu ....................... H01R 13/6585
(Continued)

FOREIGN PATENT DOCUMENTS

TW 201545423 A 12/2015

*Primary Examiner* — Tho D Ta
*Assistant Examiner* — Nader J Alhawamdeh
(74) *Attorney, Agent, or Firm* — Tim Tingkang Xia, Esq.; Locke Lord LLP (57) ABSTRACT

An electrical connector, including an insulating body; multiple first terminals, insert molded into the insulating body and having at least one grounding terminal, at least one power supply terminal and a pair of differential signal terminals located between the grounding terminal and the power supply terminal adjacent to each other; and a middle shielding sheet, insert molded into the insulating body, and located above or below the first terminals. The middle shielding sheet has, on at least one side of a central line of the middle shielding sheet, a notch and a first protruding portion away from the central line as compared to the notch. The central line extends in a front-rear direction. The notch is concavely provided backward from a front end edge of the middle shielding sheet, and vertically corresponds to the power supply terminal. The first protruding portion has a through-hole vertically corresponding to the grounding terminal.

20 Claims, 8 Drawing Sheets

Related U.S. Application Data (60) Provisional application No. 62/024,728, filed on Jul. 15, 2014.

(51) Int. Cl.

| | | |
|---|---|---|
| *H01R 12/00* | (2006.01) | |
| *H01R 24/00* | (2011.01) | |
| *H01R 12/70* | (2011.01) | |
| *H01R 13/6594* | (2011.01) | |
| *H01R 13/6585* | (2011.01) | |
| *H01R 24/60* | (2011.01) | |
| *B29C 63/00* | (2006.01) | |
| *H01R 43/18* | (2006.01) | |
| *H01R 13/6477* | (2011.01) | |
| *H01R 107/00* | (2006.01) | |

(52) U.S. Cl.
CPC ..... *H01R 13/6477* (2013.01); *H01R 13/6585* (2013.01); *H01R 13/6594* (2013.01); *H01R 24/00* (2013.01); *H01R 24/60* (2013.01); *H01R 24/78* (2013.01); *H01R 43/18* (2013.01); *H01R 2107/00* (2013.01)

(58) Field of Classification Search
USPC .......................................... 439/607.11, 660
See application file for complete search history.

(56) References Cited

U.S. PATENT DOCUMENTS

| | | | |
|---|---|---|---|
| 9,496,653 B2 | 11/2016 | Little et al. | |
| 10,063,012 B2* | 8/2018 | Chang | H01R 13/646 |
| 10,320,126 B2* | 6/2019 | Ju | H01R 13/6585 |
| 2012/0322306 A1* | 12/2012 | Tai | H01R 13/6477 |
| | | | 439/607.01 |
| 2014/0194005 A1* | 7/2014 | Little | H01R 13/6585 |
| | | | 439/607.28 |
| 2016/0149350 A1* | 5/2016 | Kao | H01R 12/724 |
| | | | 439/607.05 |
| 2016/0149360 A1* | 5/2016 | Lin | H01R 13/506 |
| | | | 439/676 |
| 2016/0261056 A1* | 9/2016 | Jiang | H01R 13/6585 |

* cited by examiner

METHOD FOR MOLDING ELECTRICAL CONNECTOR

CROSS-REFERENCE TO RELATED APPLICATION

This application is a continuation application of U.S. application Ser. No. 14/621,134, filed Feb. 12, 2015, which itself claims priority to and benefit of, under 35 U.S.C. § 119(e), U.S. provisional patent application Ser. No. 62/024,728, filed Jul. 15, 2014, entitled "ELECTRICAL CONNECTOR," by Ted Ju. The entire contents of the above-identified applications are incorporated herein by reference.

Some references, if any, which may include patents, patent applications and various publications, may be cited and discussed in the description of this invention. The citation and/or discussion of such references, if any, is provided merely to clarify the description of the present invention and is not an admission that any such reference is "prior art" to the invention described herein. All references listed, cited and/or discussed in this specification are incorporated herein by reference in their entireties and to the same extent as if each reference was individually incorporated by reference.

FIELD OF THE INVENTION

The present invention relates to a method for molding an electrical connector, and particularly to an electrical connector molding method that ensures the true position and the high-frequency performance of terminals.

BACKGROUND OF THE INVENTION

An existing electrical connector used to transmit a high-frequency signal includes an insulating body. An upper row of terminals and a lower row of terminals are disposed in the insulating body. The number of each row of terminals is large, and the terminal is in a slender shape, and includes a flat contact portion and a soldering portion bending downward and extending from the contact portion. A middle shielding sheet is disposed between the upper row of terminals and the lower row of terminals, and used to shield electromagnetic interference between the two rows of terminals. To ensure thinness of the electrical connector, the thickness of the insulating body of this electrical connector is generally small, and all the terminals can only be densely arranged in the insulating body. A molding process of this electrical connector is as follows: first performing molding to obtain a lower-row terminal module, where the lower-row terminal module is provided with a lower insulator and lower conducting terminals; performing stamping to obtain a row of upper conducting terminals, where the head and the tail (that is, front end of contact portion and tail end of soldering portion) of the row of upper conducting terminals are each connected to a strip; then, cutting off the strip of the front end, then placing the row of upper conducting terminals and a middle shielding sheet together into a mold cavity by using the strip of the tail end, and covering the upper conducting terminals and the middle shielding sheet with an upper insulator by means of an insert-molding technique to form an upper-row terminal module; and then assembling the upper-row terminal module and lower-row terminal module together to form the electrical connector.

However, after the upper conducting terminals are obtained by means of stamping, the entire row of the upper conducting terminals is connected into a whole only by the strip of the tail end. The upper conducting terminals are all of a slender structure, the entire row of upper conducting terminals is arranged densely, and in addition, a stress is generated when the soldering portion at the tail end bends. Those easily cause one end of a terminal that is not connected to the strip to warp or deflect, resulting in that two adjacent terminals are easily approaching or even contacting each other, and the true position of the terminals is bad. Thus, during subsequent insert-molding, the entire row of upper conducting terminals is not easily placed into the mold cavity. After the entire row of upper conducting terminals is forcibly placed into the mold cavity, and when the upper row conducting terminals are clamped and positioned by the positioning pin, the terminals are easily damaged by pressing or the mold is easily damaged.

Therefore, a heretofore unaddressed need exists in the art to address the aforementioned deficiencies and inadequacies.

SUMMARY OF THE INVENTION

In one aspect, the present invention is directed to a method for molding an electrical connector that ensures a good true position of terminals, and does not damage the terminals by pressing or damage a mold in a molding process.

In one embodiment, a method for molding an electrical connector includes the following steps:

S1: providing a row of first terminals, and integrally wrapping an insulating block on the first terminals using an insert-molding technique, where the insulating block covers a part of each first terminal, and the insulating block and the row of first terminals together form a first terminal module;

S2: providing a middle shielding sheet; and

S3: integrally wrapping an insulating body around the middle shielding sheet and the first terminal module using the insert-molding technique.

In one embodiment, in the step S1, the first terminal includes a contact portion, a soldering portion, and a connection portion connecting the contact portion and the soldering portion, and the insulating block covers a part of each connection portion. In the step S3, a part of each first terminal is insert-molded in the insulating body, the contact portion is exposed from a surface of the insulating body, and the soldering portion extends out of the insulating body.

In one embodiment, in the step S3, the middle shielding sheet includes a plate-shaped main body and a soldering pin extending from a back end of the main body. The main body is insert molded in the insulating body, and the soldering pin is exposed from the insulating body.

In one embodiment, in the step S1, a front end of each first terminal is connected to a first strip, and a back end of each first terminal is connected to a second strip. After the step S1, the method further includes a step S11: separating the first strip from the front ends of the first terminals, so that the front ends of the first terminals become free ends. In the step S2, a front end of the middle shielding sheet is connected to a third strip. After the step S2, and before the step S3, the method further includes a step S21: positioning the row of first terminals above the middle shielding sheet using the second strip and the third strip. After the step S3, the method further includes a step S31: separating the second strip from the back end of the first terminals.

In one embodiment, the method of the present invention further includes a step S4: providing a row of second terminals, and integrally wrapping a plastic block on the second terminals using the insert-molding technique, where the plastic block covers a part of each second terminal, and the plastic block and a row of second terminals together form a second terminal module. The step S4 and the steps SI, S2, and S3 may not in sequence.

In one embodiment, after the step S4, the method further includes a step S5: assembling and fix the second terminal module to the insulating body formed in the step S3.

In one embodiment, the row of first terminals includes a high-speed terminal and a non-high-speed terminal, where the high-speed terminal is a differential signal terminal for transmitting a universal serial bus (USB) 3.0 signal.

In another aspect, the present invention is directed to a method for molding an electrical connector. In one embodiment, the method includes the following steps:

S1: providing a row of first terminals, where the first terminal includes a first contact portion, a first connection portion extending from a first contact portion, and a first soldering portion bending from the first connection portion; and integrally wrapping an insulating block on the first connection portions using an insert-molding technique, where the insulating block and the row of first terminals together form a first terminal module;

S2: providing a middle shielding sheet, where the middle shielding sheet includes a plate-shaped main body and a soldering pin extending from a back end of the main body; and S3: integrally wrapping an insulating body around the middle shielding sheet and the first terminal module using the insert-molding technique, where the insulating body includes a base and a tongue extending from the base, the main body is insert molded in the tongue and the base, a part of each first terminal is insert molded in the insulating body, the first contact portion is exposed from a surface of the tongue, and the first soldering portion and the soldering pin extend out of the base.

In one embodiment, in the step S1, a front end of each first contact portion is connected to a first strip, and a back end of each first soldering portion is connected to a second strip. After the step S1, the method further includes a step S11: separating the first strip from the front ends of the first contact portions, so that the front ends of the first contact portions become free ends.

In one embodiment, in the step S2, a front end of the main body of the middle shielding sheet is connected to a third strip. After the step S2, and before the step S3, the method further includes a step S21: positioning the row of first terminals above the middle shielding sheet using the second strip and the third strip. After the step S3, the method further includes a step S31: separating the second strip from the back ends of the first soldering portions.

In one embodiment, the method of the present invention further includes a step S4: providing a row of second terminals, where each of the second terminals includes a second contact portion, a second soldering portion and a second connection portion connecting the second contact portion and the second soldering portion; and integrally wrapping a plastic block on the second connection portions using the insert-molding technique, where the plastic block and the row of second terminals together form a second terminal module. The step S4 and the steps S1, S2, and S3 may not in sequence. In the step S4, a front end of each second contact portion is connected to a fourth strip, a back end of each second soldering portion is connected to a fifth strip, and side edges of two second terminals located at an outermost side of the row of second terminals are separately connected to the fifth strip. After the step S4, the method further includes a step S41: separating the fourth strip from the front ends of the second contact portions, and separating the soldering portions of the second terminals from the fifth strip, so that a front end and a back end of each second terminal become free ends, and the side edges of the two second terminals at the outermost side are kept connected to the fifth strip.

After the step S41, the method further includes a step S5: driving the second terminal module by using the fifth strip, driving, by using the third strip, the insulating body formed in the step S31, and assembling and fixing the second terminal module to the insulating body. After the step S5, the method further includes a step S6: separately removing the third strip and the fifth strip. After the step S6, the method further includes a step S7: assembling an upper shielding sheet and a lower shielding sheet to an upper surface and a lower surface of the insulating body respectively; and then, sleeving the insulating body from back to front with a shielding case, and conducting the shielding case to the upper shielding sheet and the lower shielding sheet.

In one embodiment, in the step S3, the insulating block and the insulating body are fused and bonded.

In another aspect, the present invention also further provides an electrical connector that includes: an insulating body; a plurality of first terminals, insert molded into the insulating body, and comprising at least one grounding terminal, at least one power supply terminal and a pair of differential signal terminals located between one of the at least one grounding terminal and one of the at least one power supply terminal adjacent to the one of the at least one grounding terminal; and a middle shielding sheet, insert molded into the insulating body, and located above or below the multiple first terminals, wherein the middle shielding sheet is provided, on at least one side of a central line of the middle shielding sheet, with a notch and a first protruding portion away from the central line as compared to the notch, the central line extends in a front-rear direction, the notch is concavely provided backward from a front end edge of the middle shielding sheet and vertically corresponds to the power supply terminal, the first protruding portion has a through-hole vertically corresponding to one of the at least one grounding terminal, the middle shielding sheet is provided with a pair of penetration holes between the through-hole and the notch at a same side of the central line, the penetration holes are spaced from each other and vertically correspond to the pair of differential signal terminals.

In one embodiment, on the middle shielding sheet, the through-hole and the notch are located in front of the penetration holes.

In one embodiment, on the middle shielding sheet, a width of the notch in a left-right direction is greater than that of each of the penetration holes in the left-right direction.

In one embodiment, on the middle shielding sheet, a length of each of the penetration holes in the front-rear direction is greater than a width of each of the penetration holes in a left-right direction.

In one embodiment, on the middle shielding sheet, a length of each of the penetration holes in the front-rear direction is greater than a length of the notch in the front-rear direction and a length of the through-hole in the front-rear direction.

In one embodiment, the at least one grounding terminal protrudes forward beyond the differential signal terminals, and the through-hole is located in front of the differential signal terminals.

In one embodiment, the middle shielding sheet has two notches, two first protruding portions, and two pairs of penetration holes respectively provided at two opposite sides of the central line, wherein each of the first protruding portions at each side of the central line is located away from the central line as compared to the corresponding notch, and each pair of the penetration holes at each side of the central line is provided between the corresponding notch and the corresponding first protruding portion; each through-hole vertically corresponds to one of the at least one grounding terminal; each notch vertically corresponds one power supply terminal; and each pair of penetration holes vertically corresponds to one pair of the differential signal terminals.

In one embodiment, a slot is concavely provided from each of two side edges of the middle shielding sheet, the penetration holes and the slot are arranged abreast in the left-right direction, and the through-hole is located in front of the slot.

In one embodiment, the two notches, the two through-holes and the two pairs of penetration holes are bilaterally symmetric to the central line, respectively.

In one embodiment, a second protruding portion is formed between the two notches, and the central line passes through the second protruding portion.

In one embodiment, a front end edge of the first protruding portion protrudes forward to a front end edge of the second protruding portion.

In one embodiment, the middle shielding sheet is provided with an opening located behind the second protruding portion, and four of the first terminals are provided between two of the power supply terminals and correspond to the opening in the vertical direction.

In one embodiment, a part of a left side edge of the middle shielding sheet is formed at a left side of a corresponding first protruding portion, and a part of a right side edge of the middle shielding sheet is formed at a right side of the corresponding first protruding portion.

In one embodiment, the insulating body has a base and a tongue extending forward from the base, the tongue has an upper surface and a lower surface oppositely arranged, each of the first terminals has a first contact portion exposed from the upper surface, and the through-hole, the notch and the penetration holes are embedded in the tongue, respectively.

In one embodiment, the middle shielding sheet has at least one first central line and at least one second central line respectively extending in the front-rear direction, the at least one first central line passes through a central point of a width of the through-hole in a left-right direction, the at least one second central line passes through a central point of a width of the notch in the left-right direction, and the pair of penetration holes is located between the at least one first central line and the at least one second central line adjacent to each other.

In one embodiment, the through-hole vertically corresponds to the first contact portion of the at least one grounding terminal, the notch vertically corresponds to the first contact portion of the at least one power supply terminal, and each of the penetration holes vertically corresponds to the first contact portion of each of the differential signal terminals.

In one embodiment, a plurality of positioning holes are concavely provided on the upper surface, and each of the positioning holes is located between two adjacent ones of the first terminals.

In one embodiment, two grooves are respectively concavely provided at two side edges of the tongue, two slots is respectively concavely provided at two side edges of the middle shielding sheet, and each of the two slots is exposed to a corresponding one of the two grooves.

In one embodiment, an electrical connector further includes a plurality of second terminals, each second terminal having a second contact portion installed on the lower surface, a second soldering portion exposed from the base, and a vertical segment vertically extending between the second contact portion and the second soldering portion, wherein each of the first terminals has a first soldering portion exposed from the base and a vertical segment vertically extending between the first contact portion and the first soldering portion, the middle shielding sheet has a main body in a rectangular shape along the front-rear direction and a bending portion bending downward from a rear end of the main body, the main body is located between the first contact portion and the second contact portion in the vertical direction, and the bending portion is located between the vertical segment of the first terminal and the vertical segment of the second terminal in the front-rear direction.

In one embodiment, the first terminals sequentially comprise, from left to right, a grounding terminal, a pair of differential signal terminals for transmitting a universal serial bus (USB) 3.0 signal, a power supply terminal, a reserved terminal, a pair of USB 2.0 terminals, a reserved terminal, a power supply terminal, a pair of differential signal terminals for transmitting the USB 3.0 signal, and a grounding terminal.

In certain embodiments of the present invention, by first insert molding first connection portions of a row of first terminals in an insulating block, the row of first terminals is fixed as a whole. The insulating block plays a role of holding the first terminals, free ends of the first terminals are prevented from warping or deflecting, and two adjacent terminals can be prevented from contacting each other, so that true positions of the terminals are good. During subsequent insert-molding, the entire row of first terminals is easily placed into a mold cavity, so as to avoid damaging terminals by pressing or damaging of the mold when the first terminals are clamped and positioned by the positioning pin. In a process of insert molding the first terminals and the middle shielding sheet into the insulating body, it is necessary to position the first terminals, where requirements for positioning accuracy of the paired differential signal terminals are very high. The grounding terminals, the power supply terminals and the differential signal terminals in the first terminals vertically correspond to the through-holes, the notches and the penetration holes in the middle shielding sheet, respectively. Thus, in the aforementioned insert molding process, a plurality of positioning pins of a mold may penetrate through the through-holes, the notches and the penetration holes to correspondingly urge against the grounding terminals, the power supply terminals and the differential signal terminals, thus preventing the grounding terminals, the power supply terminals and the differential signal terminals from deformation and offset in the vertical direction caused by an impact from fused plastics in the molding process, and thereby accurately positioning various terminals on the insulating body. Specifically, a pair of positioning pins may be limited by a pair of penetration holes not communicated with each other, thereby limiting an offset of the positioning pins corresponding to the differential signal terminals in the left-right direction. Thus, the positioning pins can achieve more accurate positioning so as to urge against the differential signal terminals, and the strength of the middle shielding sheet is ensured.

These and other aspects of the present invention will become apparent from the following description of the preferred embodiment taken in conjunction with the following drawings, although variations and modifications therein may be effected without departing from the spirit and scope of the novel concepts of the disclosure.

BRIEF DESCRIPTION OF THE DRAWINGS

The accompanying drawings illustrate one or more embodiments of the invention and together with the written description, serve to explain the principles of the invention. Wherever possible, the same reference numbers are used throughout the drawings to refer to the same or like elements of an embodiment.

DETAILED DESCRIPTION OF THE INVENTION

The present invention is more particularly described in the following examples that are intended as illustrative only since numerous modifications and variations therein will be apparent to those skilled in the art. Various embodiments of the invention are now described in detail. Referring to the drawings, like numbers indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present invention.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower", can therefore, encompasses both an orientation of "lower" and "upper," depending of the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, the terms "comprising", "including", "carrying", "having", "containing", "involving", and the like are to be understood to be open-ended, i.e., to mean including but not limited to.

The description will be made as to the embodiments of the present invention in conjunction with the accompanying drawings in FIGS. 1-8. In accordance with the purposes of this invention, as embodied and broadly described herein, this invention, in one aspect, relates to a method for molding an electrical connector.

As shown in FIG. 1 to FIG. 4, an electrical connector molded using a method according to certain embodiments of the present invention includes an insulating body 1, a first terminal module 2 and a second terminal module 3 which are vertically disposed, and a shielding case 4 wrapping the insulating body 1, the first terminal module 2 and the second terminal module 3.

Referring to FIG. 1, FIG. 2, FIG. 4 and FIG. 8, the insulating body 1 is made of a plastic material, and includes a base 10 and a tongue 11 extending forward from the base 10. The thickness of the base 10 in a vertical direction is greater than the thickness of the tongue 11. The entire tongue 11 is rectangular along a front-rear direction, and the tongue 11 has an upper surface 112 and a lower surface 114 opposite to each other. The tongue 11 further has a left-right direction perpendicular to the front-rear direction and the vertical direction. For convenience of understanding, as shown in a three-dimensional coordinate system in FIG. 1, the axis X denotes a forward direction, the axis Y denotes a direction toward the right, and the axis Z denotes an upward direction. Two grooves 115 are respectively concavely provided at two side edges of the tongue 11, and each groove 115 has a U-shaped first groove edge 1151. Multiple positioning holes 116 are concavely provided downward on the upper surface 112. Multiple terminal slots are concavely provided on the lower surface 114 and arranged abreast in the left-right direction. The terminal slots include two first terminal slots 117, two pairs of second terminal slots 118 and two third terminal slots 119. The two first terminal slots 117 are located at an outermost side of the terminal slots, the two third terminal slots 119 are located between the two first terminal slots 117, and the pair of second terminal slots 118 is arranged between one first terminal slot 117 and the third terminal slot 119 adjacent to each other.

A row of second terminals 31 are vertically and symmetrically arranged. Each row of the row of first terminals 21 and the row of second terminals 31 includes high-speed terminals and non-high-speed terminals. Specifically, each row of the row of first terminals 21 and the row of second terminals 31 is sequentially from left to right as follows: a grounding terminal A, a pair of differential signal terminals (high-speed terminals) B for transmitting a USB 3.0 signal, a power supply terminal C, a reserved terminal, a pair of USB 2.0 terminals, a reserved terminal, a power supply terminal C, a pair of differential signal terminals (high-speed terminals) B for transmitting a USB 3.0 signal, and a grounding terminal A. The grounding terminals A and the power supply terminals C protrude forward beyond the differential signal terminals B respectively.

The first terminal 21 and the second terminal 31 are both made of a metal plate material and stamped into a slender shape. Each first terminal 21 includes a first contact portion 210, a first connection portion 211 extending from the first contact portion 210, and a first soldering portion 212 bending from an end of the first connection portion 211. The first connection portion 211 includes a horizontal segment 2110 extending horizontally backward from a back end of the first contact portion 210 and a vertical segment 2111 bending downward from the horizontal segment 2110. Multiple first terminals 21 are fixed into a row by using an insulating block 22, and the insulating block 22 and the row of first terminals 21 together form the first terminal module 2. The insulating block 22 is in a long strip shape, and wraps a part of each first connection portion 211 by insert molding. Specifically, the insulating block 22 wraps a part of the horizontal segment 2110. The first terminal module 2 as a whole is further insert molded in the insulating body 1, and a part of the first terminal 21 is insert molded in the insulating body 1. More specifically, the first contact portion 210 is exposed from the surface of the tongue 11. Each positioning hole 116 is located at the first contact portion 210 between two adjacent ones of the first terminals 21, and the first soldering portion 212 extends out of the base 10.

Likewise, each second terminal 31 includes a second contact portion 310, a second connection portion 311 extending from the second contact portion 310, and a second soldering portion 312 bending from an end of the second connection portion 311. The second connection portion 311 includes a horizontal segment (not shown) extending backward horizontally from a back end of the second contact portion 310 and a vertical segment (not shown) bending downward from the horizontal segment (not shown). Multiple second terminals 31 are fixed into a row using a plastic block 32, and the plastic block 32 and the row of second terminals 31 together form the second terminal module 3. The plastic block 32 is in a long strip shape, and wraps each second connection portion 311 by insert molding. Specifically, the plastic block 32 almost wraps the entire horizontal segment and vertical segment.

The electrical connector of this embodiment further includes a middle shielding sheet 5. The middle shielding sheet 5 and the first terminal module 2 are together insert molded in the insulating body 1, and the second terminal module 3 is assembled to the lower surface of the insulating body 1 from bottom upward from the bottom of the insulating body 1, and is tightly locked to the lower surface of the insulating body 1. The second contact portions 310 are correspondingly installed in the terminal slots and exposed from the lower surface 114, and the number of the terminal slots is equal to that of the second terminals 31. Therefore, according to arrangement of the second terminals 31, the grounding terminals A are correspondingly arranged in the first terminal slots 117, the differential signal terminals B are correspondingly arranged in the second terminal slots 118, the power supply terminals C are correspondingly arranged in the third terminal slots 119, and the second soldering portions 312 are exposed from the base 10. The middle shielding sheet 5 is located between the first terminal module 2 and the second terminal module 3 in the vertical direction.

The middle shielding sheet 5 is made of a metal material, and includes a main body 50 which is rectangular along the front-rear direction, and two soldering pins 51 separately bending downward and extending from a back end of the main body 50. The soldering pins 51 are used for conducting a grounding path in a circuit board (not shown). A bending portion 52 further bends downward and extends from the center of the back end of the main body 50, and the bending portion 52 is located between the two soldering pins 51, and is at a distance from the soldering pins 51. The main body 50 is insert molded into the insulating body 1, the main body 50 of the middle shielding sheet 5 is located between a row of first contact portions 210 and a row of second contact portions 310, and also extends to a position between the first connection portion 211 and the second connection portion 311, and the bending portion 52 is located between the vertical segment 2111 of the first terminal 21 and the vertical segment of the second terminal 31. The soldering pins 51 are exposed from the insulating body 1. Specifically, the soldering pins 51 extend out of the base 10, and are used for being soldered to the circuit board and conducting an interference signal to the grounding path on the circuit board.

In such configuration, the middle shielding sheet 5 can fully shield an interference signal between the first terminals 21 and the second terminals 31, so as to alleviate crosstalk in a signal transmission process.

The middle shielding sheet 5 is provided, on at least one side of a central line L1 thereof, with a notch 501 and a first protruding portion 502 away from the central line L1 as compared to the notch 501, where the central line L1 extends in the front-rear direction. The notch 501 is concavely provided backward from a front end edge of the middle shielding sheet 5, and the first protruding portion 502 has a through-hole 503 penetrating vertically. The middle shielding sheet 5 is further provided with a pair of penetration holes 504 between the through-hole 503 and the notch 501 at the same side of the central line L1. Three specific positional relationships are as follows. According to the first positional relationship, the pair of penetration holes 504 is provided between opposite innermost sides of the notch 501 and the through-hole 503 in the left-right direction. According to the second positional relationship, the pair of penetration holes 504 is provided between a central point of the width of the notch 501 in the left-right direction and a central point of the width of the through-hole 503 in the left-right direction, but the pair of penetration holes 504 exceed the opposite innermost sides of the notch 501 and the through-hole 503 in the left-right direction. According to the third positional relationship, the pair of penetration holes 504 is provided between opposite outermost sides of the notch 501 and the through-hole 503 in the left-right direction, but the pair of penetration holes 504 protrudes out of the central point of the width of the notch 501 in the left-right direction and the central point of the width of the through-hole 503 in the left-right direction, where the two penetration holes 504 in each pair of penetration holes 504 are spaced from each other, namely not communicated with each other.

In this embodiment, the middle shielding sheet 5 has two notches 501, two first protruding portions 502, and two pairs of penetration holes 504. Specifically, at each of left and right sides of the central line L1, the middle shielding sheet 5 is provided with a notch 501 and a first protruding portion 502 away from the central line L1 as compared to the notch 501 separately, and a pair of penetration holes 504 is provided between the notch 501 and the first protruding portion 502 in each side of the central line L1. The two notches 501, the two through-holes 503 and the two pairs of penetration holes 504 are bilaterally symmetric about the central line L1, respectively. Only one second protruding portion 505 is formed between the two notches 501, and the central line L1 passes through the second protruding portion 505. A front end edge of the first protruding portion 502 protrudes forward out of a front end edge of the second protruding portion 505, and the front end edge of the first protruding portion 502 is exposed from the front end edge of the tongue 11. A part of a left side edge of the middle shielding sheet 5 is formed at a left side of the corresponding first protruding portion 502, and a part of a right side edge of the middle shielding sheet 5 is formed at a right side of the corresponding first protruding portion 502. On the middle shielding sheet 5, the through-hole 503 and the notch 501 are located in front of the penetration holes 504; the length of the penetration hole 504 in the front-rear direction is greater than the length of the notch 501 in the front-rear direction and the length of the through-hole 503 in the front-rear direction; the width of the notch 501 in the left-right direction is greater than the width of the through-hole 503 in the left-right direction and the width of the penetration hole 504 in the left-right direction respectively; and the length of the penetration hole 504 in the front-rear direction is greater than the width thereof in the left-right direction. The middle shielding sheet 5 has two first central lines R1 that are as many as the through-holes 503 and extend in a front-rear direction, two second central lines R2 that are as many as the notches 501 and extend in the front-rear direction, and four third central lines R3 that are as many as the penetration holes 504 and extend in the front-rear direction. Each of the first central lines R1 passes through the central point of the width of a corresponding through-hole 503 in the left-right direction. Each of the second central lines R2 passes through the central point of the width of a corresponding notch 501 in the left-right direction. Each of the third central lines R3 passes through the central point of the width of a corresponding penetration hole 504 in the left-right direction. Further, a pair of penetration holes 504 is located between each first central line R1 and the adjacent second central line R2. The middle shielding sheet 5 is provided with an opening 506 behind the second protruding portion 505. The opening 506 is located between the two second central lines R2, and the central line L1 passes through a central point of the width of the opening 506 in the left-right direction. The notches 501, the through-holes 503, the penetration holes 504 and the opening 506 are located in the main body 50 and embedded in the tongue 11 respectively.

A slot 507 is concavely provided at each of two side edges of the middle shielding sheet 5. The two slots 507 vertically correspond to the two grooves 115. The penetration holes 504 and the slots 507 are arranged abreast in the left-right direction, and each through-hole 503 is located in front of the corresponding slot 507 on the middle shielding sheet 5. Each slot 507 has a U-shaped second groove edge 5071 is exposed to the corresponding first groove edge 1151, thus enhancing the strength of the groove 115, and reducing abrasion during mating with a mating connector.

Figure 1:
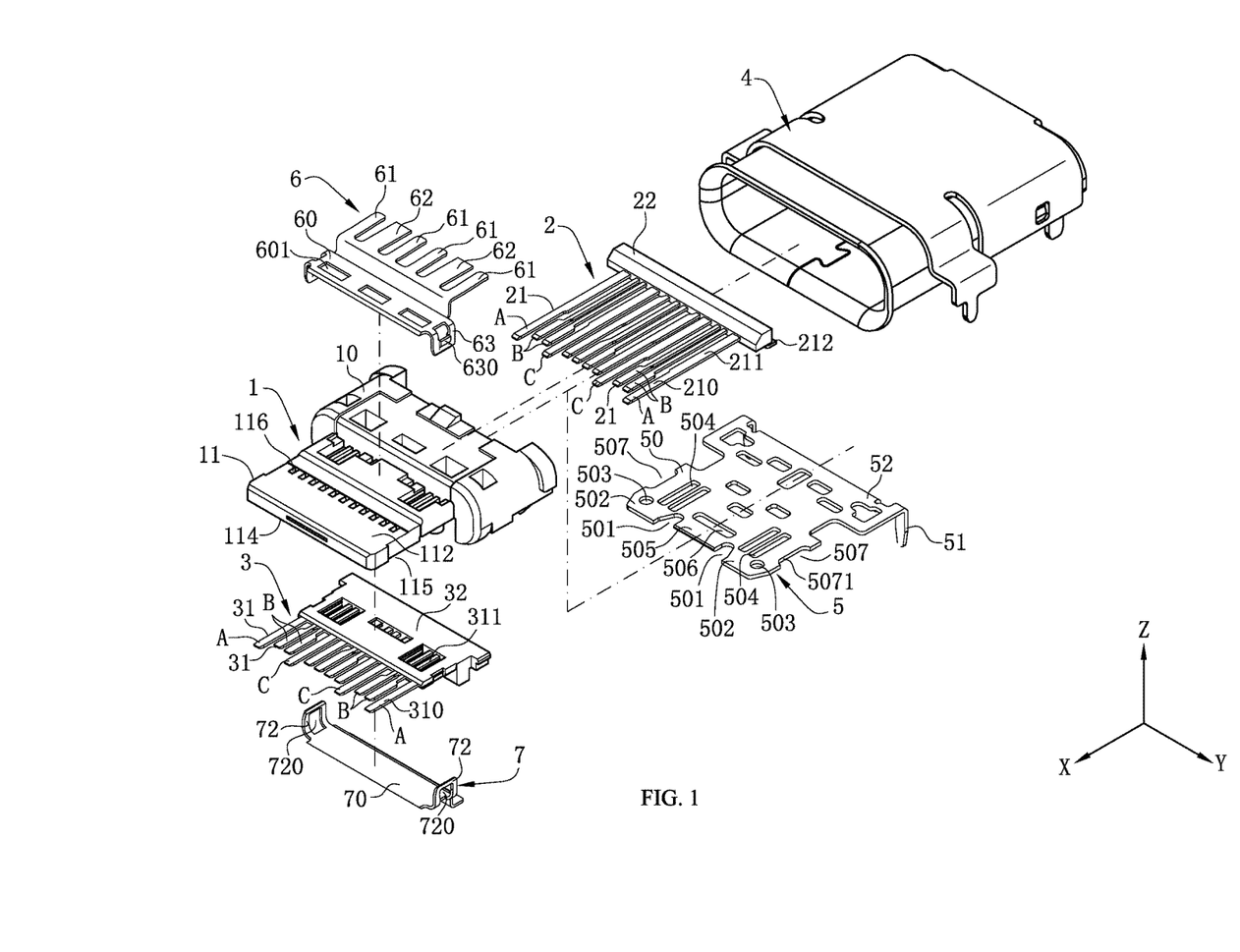
FIG. 1 is a schematic exploded view of an electrical connector according to one embodiment of the present invention.
Figure 2:
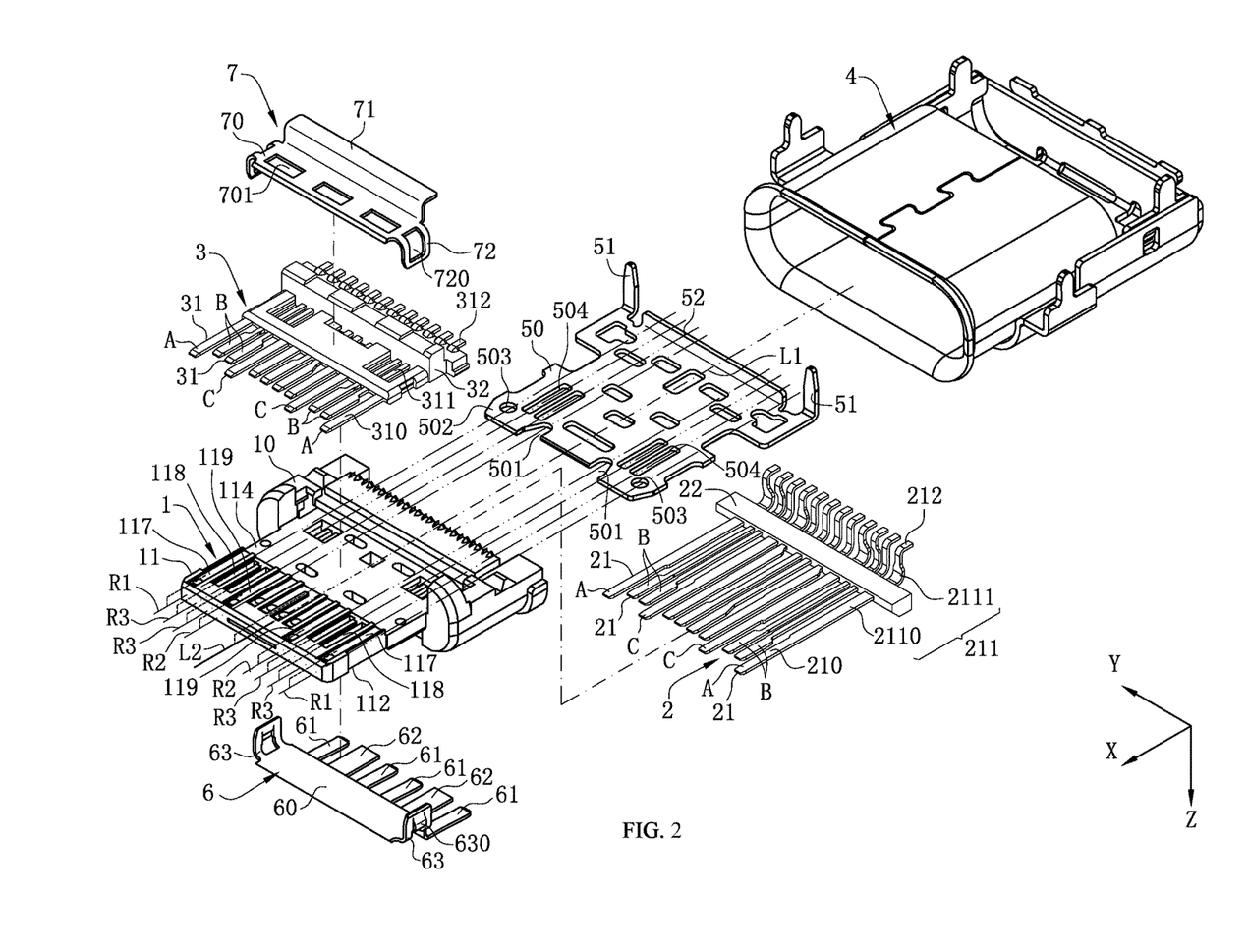
FIG. 2 is a schematic view of FIG. 1 viewed from another angle.
Figure 4:
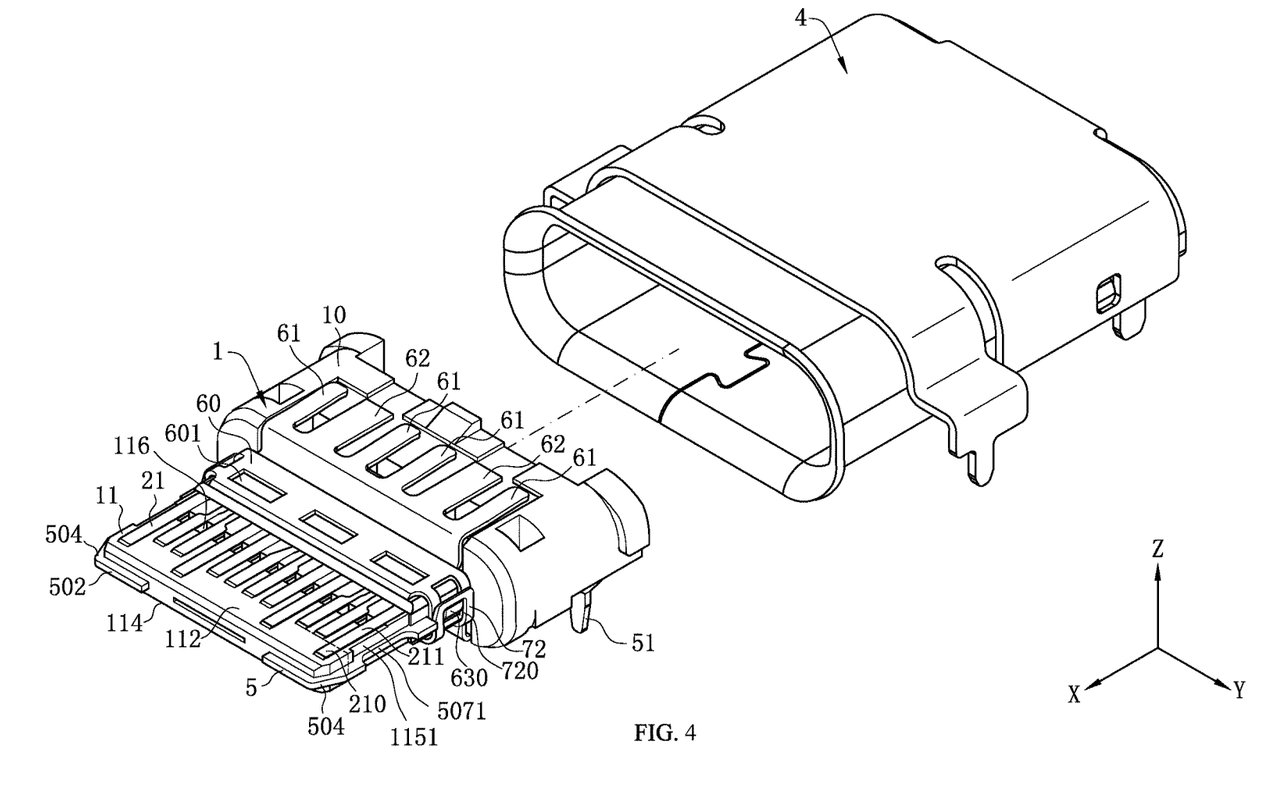
FIG. 4 is a schematic view in which a row of second terminals is assembled to the insulating body, and upper and lower shielding sheets are fixed to the insulating body in FIG. 3.
Figure 8:
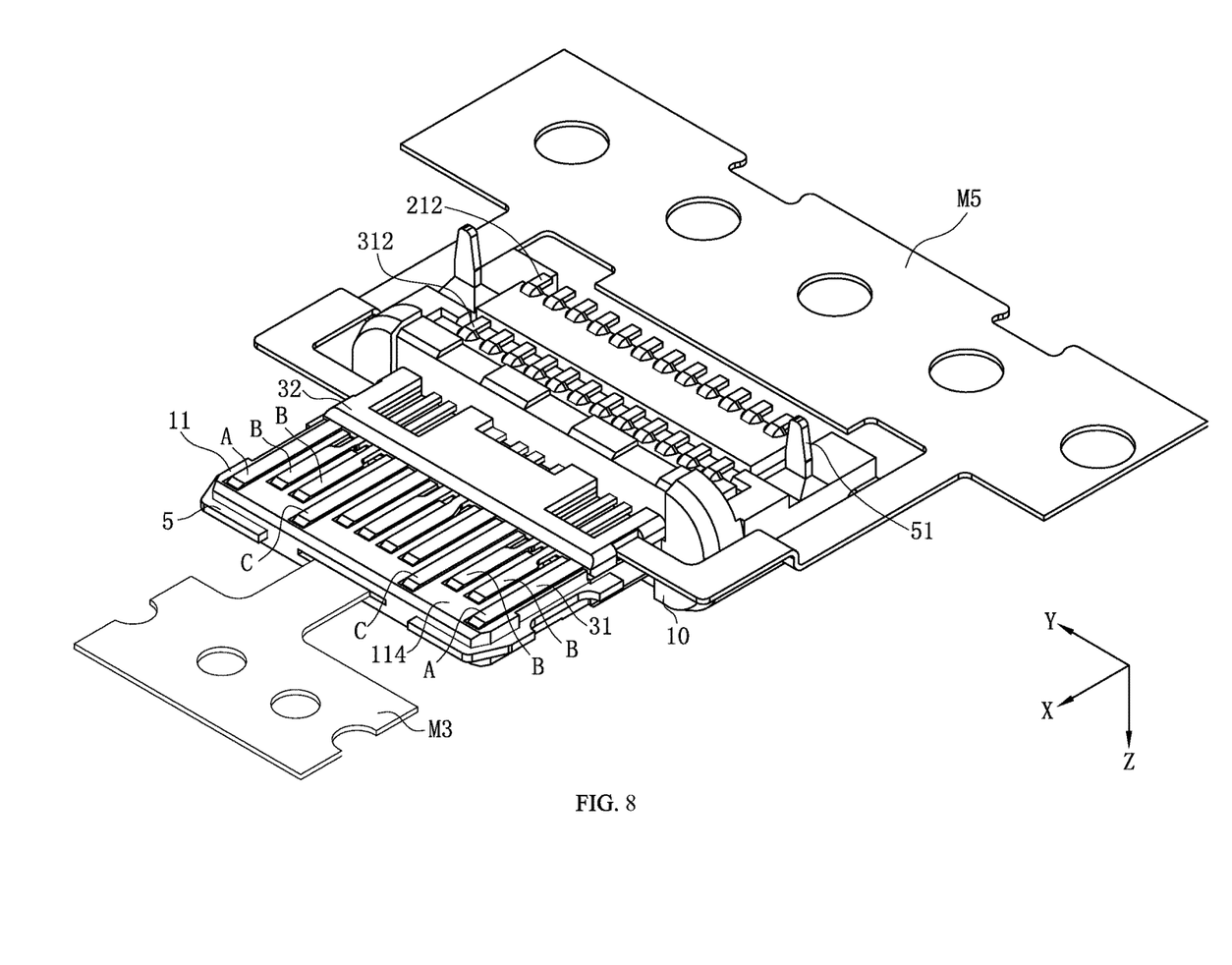
FIG. 8 is a schematic view in which the insulating body in FIG. 6 and the second terminal module in FIG. 7 are assembled together.

Referring to FIG. 2, FIG. 4 and FIG. 8, the central line L1 and a central line L2 of the tongue 11 are on the same straight line. It can thus be seen that the middle shielding sheet 5 is located at a vertical central position of the tongue 11. An intersecting line between a vertical plane where the first central line R1 is located and the lower surface 114 is substantially at a middle position of the first terminal slots 117 in the left-right direction, an intersecting line between a vertical plane where the third central line R3 is located and the lower surface 114 is substantially at a middle position of the second terminal slots 118 in the left-right direction, and an intersecting line between a vertical plane where the second central line R2 is located and the lower surface 114 is substantially at a middle position of the third terminal slots 119 in the left-right direction. The grounding terminals A in the second terminals 31 are correspondingly arranged in the first terminal slots 117, the differential signal terminals B are correspondingly arranged in the second terminal slots 118, the power supply terminals C are correspondingly arranged in the third terminal slots 119, and a row of first terminals 21 and a row of second terminals 31 are vertically and symmetrically arranged. Thus, each through-hole 503 vertically corresponds to one grounding terminal A of the first terminals 21, and the vertical plane where the first central line R1 is located is intersected with the first contact portion 210 of the grounding terminal A; each pair of penetration holes 504 vertically corresponds to a pair of differential signal terminals B of the first terminals 21, and the vertical plane where the third central line R3 is located is intersected with the first contact portion 210 of the differential signal terminal B; and each notch 501 vertically corresponds to one power supply terminal C of the first terminals 21, and the vertical plane where the second central line R2 is located is intersected with the first contact portion 210 of the power supply terminal C. The central line L1 and the central line L2 of the tongue 11 are in the same straight line, an intersecting line between a vertical plane where the central line L1 is located and the lower surface 114 is between the two middle terminal slots, and the opening 506 stretches across the four middle terminal slots in the left-right direction. It can thus be seen that the four first terminals 21 between the two power supply terminals C correspond to the opening 506 in the vertical direction. An intersecting line between an extending line of a front end edge of the differential signal terminals B of the first terminals 21 and the middle shielding sheet 5 passes through a rear half part of the through-hole 503. It can thus be seen that each through-hole 503 is located in front of the differential signal terminals B, each through-hole 503 vertically corresponds to the first contact portion 210 of a corresponding grounding terminal A, each notch 501 vertically corresponds to the first contact portion 210 of a corresponding power supply terminal C, and each penetration hole 504 vertically corresponds to the first contact portion 210 of a corresponding differential signal terminal B.

Figure 3:
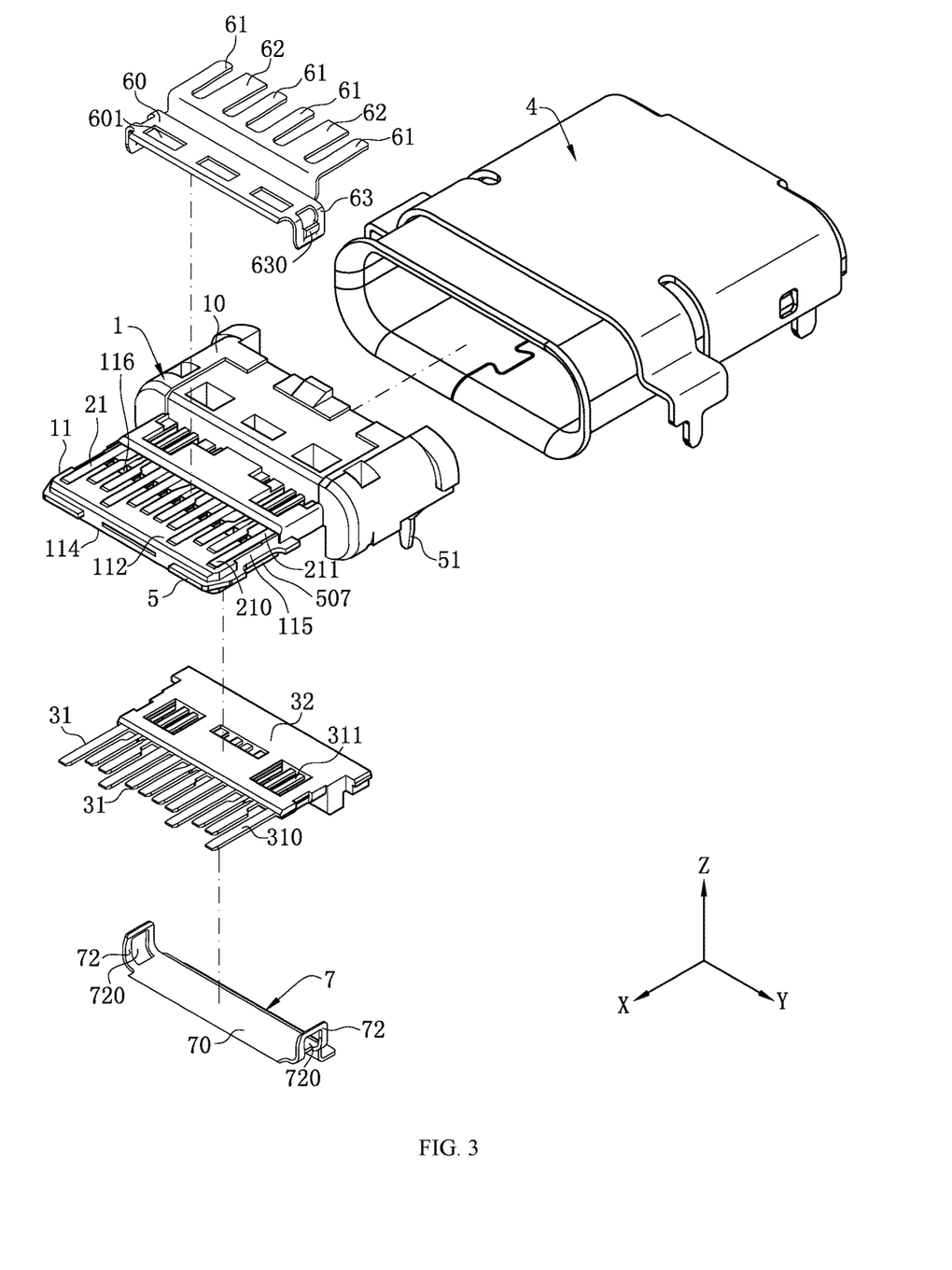
FIG. 3 is a schematic view in which a row of first terminals is fixed to an insulating body in FIG. 1.

As shown in FIG. 3 and FIG. 4, the electrical connector of this embodiment further includes an upper shielding sheet 6, a lower shielding sheet 7, and a shielding case 4 sleeving the insulating body 1 from back to front. The upper shielding sheet 6 and the lower shielding sheet 7 are respectively laminated to an upper surface and a lower surface of the insulating body 1, and the upper shielding sheet 6 and the lower shielding sheet 7 are assembled and connected to each other. Specifically, the upper shielding sheet 6 is laminated to the upper surface 112 of the tongue 11. The upper shielding sheet 6 includes a flat plate portion 60 covering the rear segment of the upper surface 112 of the tongue 11. Four elastic arms 61 extend backward from the flat plate portion 60. The elastic arms 61 are located above the base 10 and urge against the shielding case 4 upward elastically. Moreover, two material connection portions 62 further extend backward from the flat plate portion 60, so as to provide convenience for assembly of the upper shielding sheet 6.

Multiple depressed portions 601 are depressed downward from the flat plate portion 60 and used for snap-fitting a grounding elastic sheet (not shown) in a matting connector (not shown). A snap-fit portion 63 bends downward from each of two ends of the flat plate portion 60 and covers the side edge of the tongue 11, and a protruding block 630 protrudes from the snap-fit portion 63 toward the outside. The lower shielding sheet 7 is laminated to the lower surface of the plastic block 32.

The lower shielding sheet 7 includes a plate-shaped portion 70 covering the rear segment of the lower side of the tongue 11, and an urging portion 71 extending backward from the plate-shaped portion 70. The urging portion 71 is located below the base 10 and urges against the shielding case 4. Likewise, multiple depressed portions 701 are depressed upward from the plate-shaped portion 70 and used for snap-fitting a grounding elastic sheet (not shown) in a mating connector (not shown). A buckling portion 72 bends upward from each of two ends of the plate-shaped portion 70 and covers the side edge of the tongue 11. The buckling portion 72 is provided with a through-hole 720 correspondingly snap-fitting the protruding block 630 on the upper shielding sheet 6.

To further ensure contact between the lower shielding sheet 7 and the shielding case 4, the shielding case 4 and the lower shielding sheet 7 are connected by spot welding.

Figure 5:
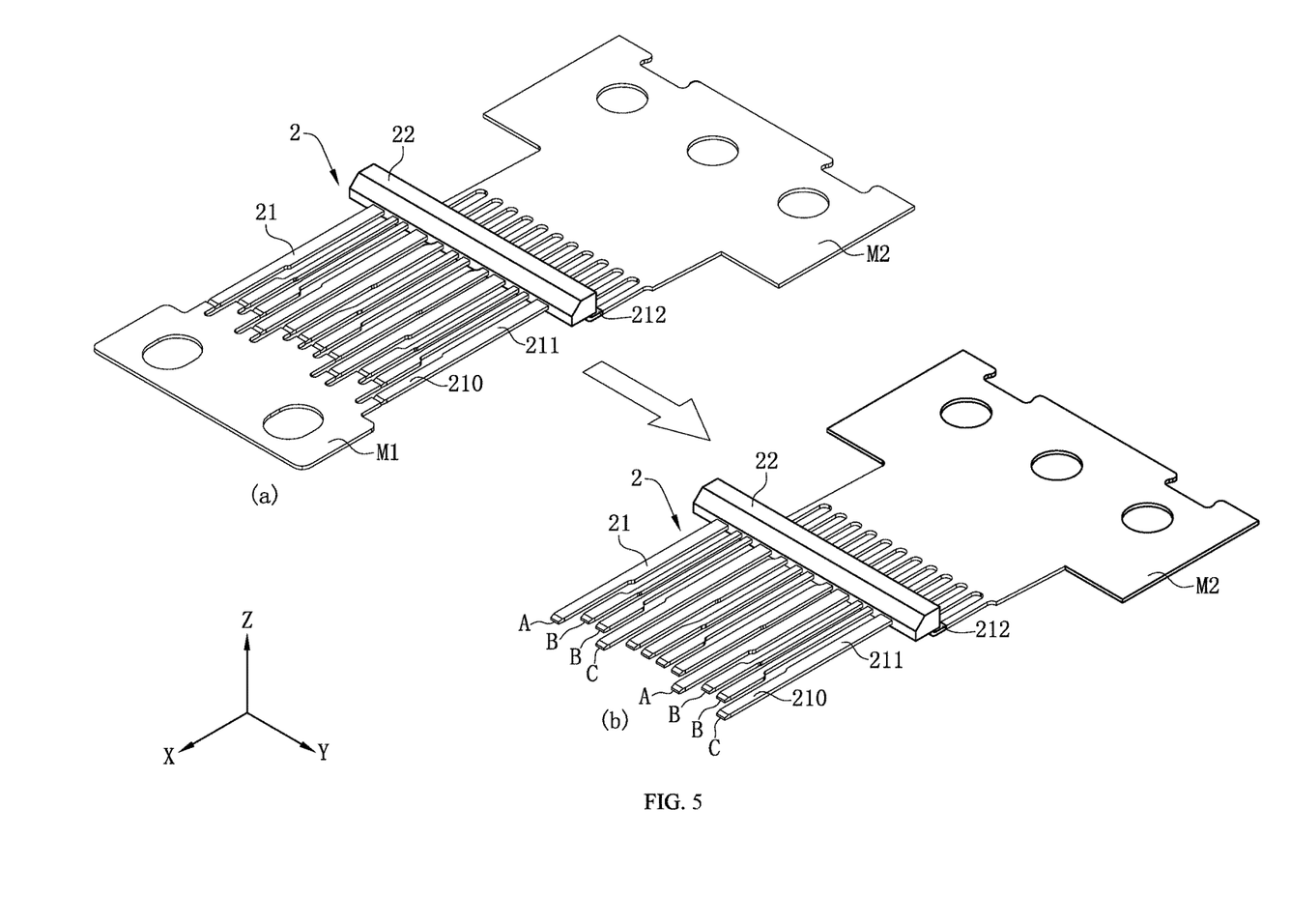
FIG. 5 is a flowchart of molding a first terminal module according to one embodiment of the present invention.

Referring to FIG. 5 to FIG. 8, a method for molding an electrical connector according to certain embodiments of the present invention includes the following steps:

Step S1: providing a row of first terminals 21, where each of the first terminals 21 includes a first contact portion 210, a first connection portion 211 extending from the first contact portion 210, and a first soldering portion 212 bending from the first connection portion 211; and integrally wrapping an insulating block 22 on the first connection portions 211 by insert molding, where the insulating block 22 and the row of first terminals 21 together form a first terminal module 2. As shown in FIG. 5(*a*), a front end of each first contact portion 210 is connected to a first strip M1, and a back end of each first soldering portion 212 is connected to a second strip M2.

Then, perform step S11: separating the first strip M1 from the front ends of the first contact portions 210, so that the front ends of the first contact portions 210 become free ends, as shown in FIG. 5(*b*).

Figure 6:
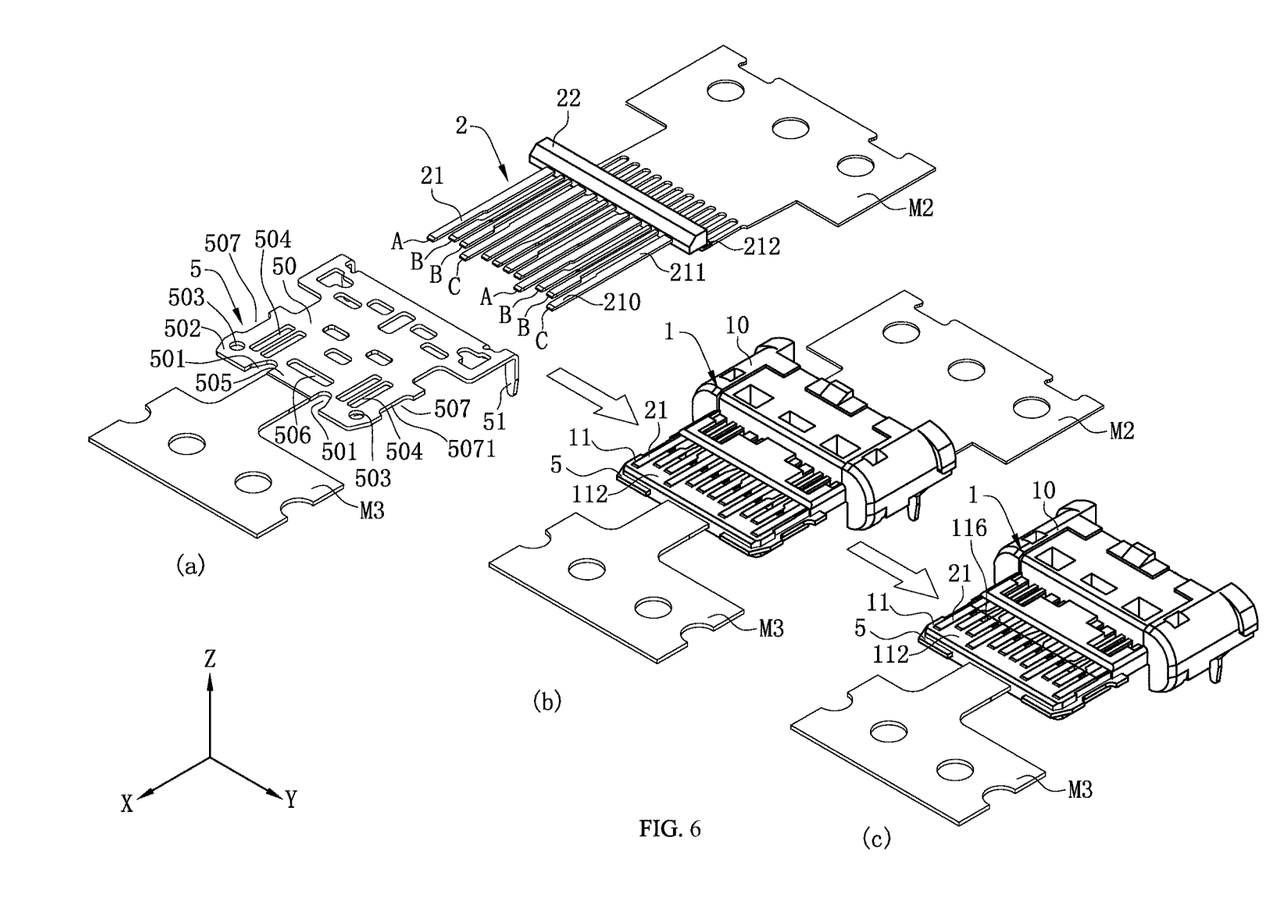
FIG. 6 is a flowchart of insert-molding the first terminal module and a middle shielding sheet together to the insulating body according to one embodiment of the present invention.

Then, perform step S2: providing a middle shielding sheet 5, where the middle shielding sheet 5 includes a plate-shaped main body 50 and two soldering pins 51 extending from a back end of the main body 50, a front end of the main body 50 is connected to a third strip M3, and in this embodiment, the third strip M3 is connected to the front end edge of the second protruding portion 505, as shown in FIG. 6(*a*).

Then, perform step S21: moving the row of first terminals 21 using the second strip M2, moving the middle shielding sheet 5 using the third strip M3, and positioning the row of first terminals 21 above the middle shielding sheet 5.

Then, perform step S3: integrally wrapping an insulating body 1 around the middle shielding sheet 5 and the first terminal module 2 by insert molding, where the insulating body 1 includes a base 10 and a tongue 11 extending from the base 10, the main body 50 is insert molded in the tongue 11 and the base 10, a part of each first terminal 21 is insert molded in the insulating body 1, the first contact portions 210 are exposed from a surface of the tongue 11, and the first soldering portions 212 and the soldering pins 51 extend out of the base 10. The structure is specifically shown in FIG. 6(*b*). In this process, the insulating block 22 and the insulating body 1 are fused and bonded.

In a process of insert molding the first terminals 21 and the middle shielding sheet 5 into the insulating body 1, the notches 501, the through-holes 503, the penetration holes 504 and the opening 506 are embedded in the tongue 11 respectively. A plurality of upper positioning pins of a mold may be located above the middle shielding sheet 5, and the upper positioning pins are distanced from the first terminals 21. Thus, in an insert molding process, the first terminals 21 can be positioned by the upper positioning pins, thereby avoiding excessive offset in the left-right direction. After the insulating body 1 is disengaged from the mold, the upper positioning pins are disengaged from the tongue 11 to form the positioning holes 116. A plurality of lower positioning pins of the mold may be located below the middle shielding sheet 5, where two of the lower positioning pins penetrate through the through-holes 503 and correspondingly urge against the grounding terminals A in the first terminals 21, four of the other lower positioning pins penetrate through the penetration holes 504 and correspondingly urge against the differential signal terminals B in the first terminals 21, two of the other lower positioning pins penetrate through the notches 501 and correspondingly urge against the power supply terminals C in the first terminals 21, and the remaining lower positioning pins penetrate through the openings 506 and correspondingly urge against the four first terminals 21 between the two power supply terminals C. Thus, in the insert molding process, the first terminals 21 will be supported by the lower positioning pins, thereby avoiding excessive offset in the vertical direction. On the middle shielding sheet 5, the width of each notch 501 in the left-right direction is greater than the width of each through-hole 503 in the left-right direction and the width of each penetration hole 504 in the left-right direction respectively, such that the distance between the first contact portion 210 of each power supply terminal C and a punch molding edge of each notch 501 is larger. Thus, a short circuit caused by contact between burrs generated during punch molding of the notch 501 and the middle shielding sheet 5 can be avoided. Then, perform step S31: separating the second strip M2 from the back ends of the first soldering portions 212, as shown in FIG. 6(*c*).

Figure 7:
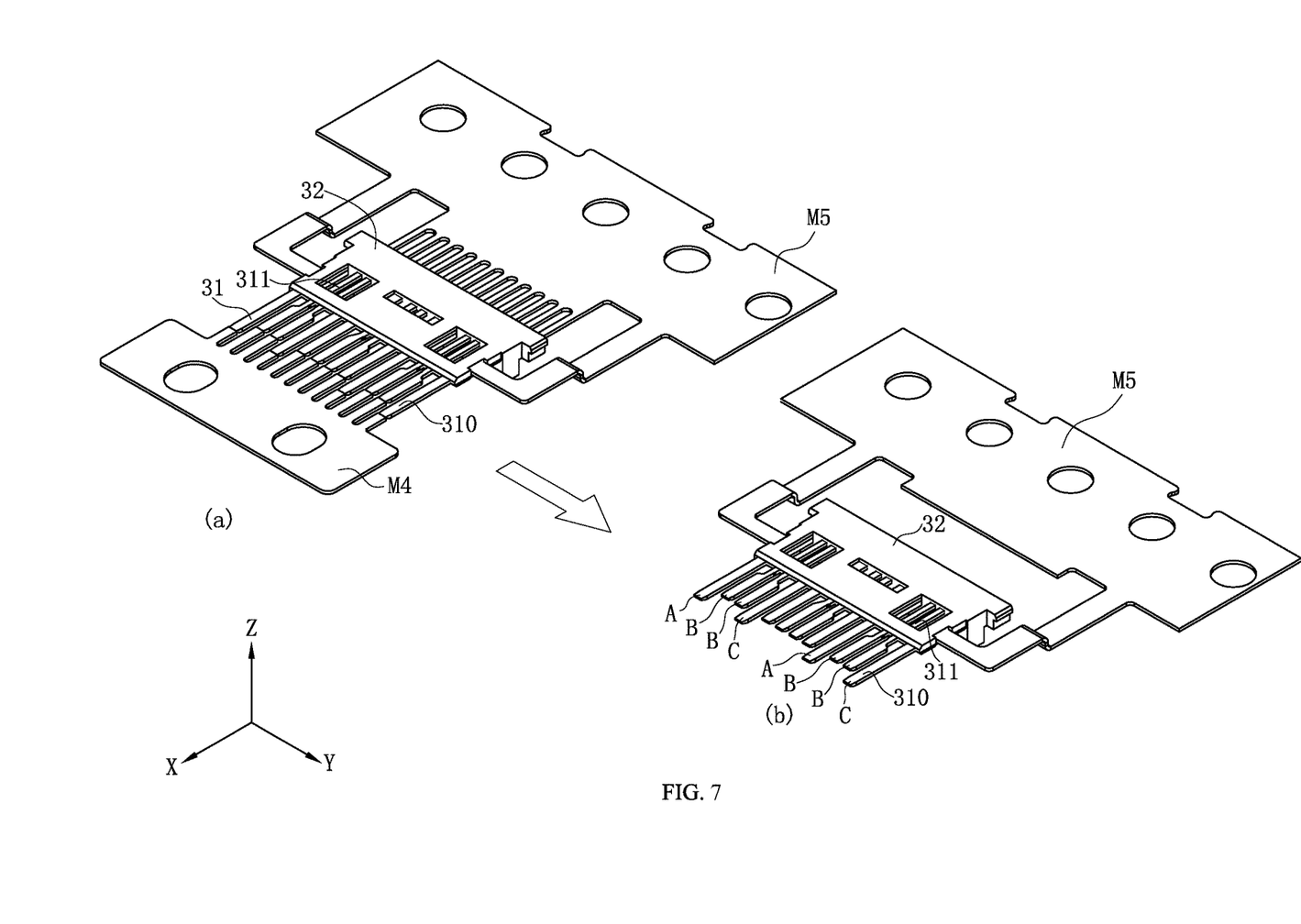
FIG. 7 is a flowchart of molding a second terminal module according to one embodiment of the present invention.

In certain embodiments, the method of the present invention further includes step S4: providing a row of second terminals 31, where each of the second terminals 31 includes a second contact portion 310, a second soldering portion 312 and a second connection portion 311 connecting the second contact portion 310 and the second soldering portion 312; and integrally wrapping a plastic block 32 on the second connection portion 311 by insert molding, where the plastic block 32 and the row of second terminals 31 together form a second terminal module 3. As shown in FIG. 7(*a*), a front end of each second contact portion 310 is connected to a fourth strip M4, a back end of each second soldering portion 312 is connected to a fifth strip M5, and side edges of two second terminals 31 located at the outermost side of the row of second terminals 31 are separately connected to the fifth strip M5.

After step S4, perform step S41: separating the fourth strip M4 from the front ends of the second contact portions 310, and separating the soldering portions 312 of the second terminals 31 from the fifth strip M5, so that front ends and back ends of the second terminals 31 become free ends, and the side edges of the two second terminals 31 at the outermost side are kept connected to the fifth strip M5, as shown in FIG. 7(*b*). It should be noted that, the process (including step S4 and step S41) shown in FIG. 7 is performed using an additional mold, and therefore can be performed simultaneously with steps shown in FIG. 5 and FIG. 6 or the process and the steps are not performed in sequence.

After step S41 is performed to obtain the structure shown in FIG. 7(b), perform step S5: driving the second terminal module 3, that is, the structure shown in FIG. 7(b), by using the fifth strip M5, and driving the insulating body 1 formed in step S31, that is, the structure shown in FIG. 6(c), by using the third strip M3, so as to assemble and fix the second terminal module 3 to the insulating body 1 and to install the second contact portion 310 into the corresponding terminal slot, to obtain the structure shown in FIG. 8.

Then, perform step S6: separately removing the third strip M3 and the fifth strip M5.

Then, perform step S7: assembling an upper shielding sheet 6 and a lower shielding sheet 7 to an upper surface and a lower surface of the insulating body 1 respectively; and finally, sleeving the insulating body 1 with a shielding case 4 from back to front, and conducting the shielding case 4 to the upper shielding sheet 6 and the lower shielding sheet 7.

The molding method according to certain embodiments of the present invention, among other things, has the following beneficial advantages:

1. In a process of insert molding the multiple first terminals 21 and the middle shielding sheet 5 into the insulating body 1, it is necessary to position the first terminals 21, where requirements for positioning accuracy of the paired differential signal terminals B are very high. In the present invention, the grounding terminals A, the power supply terminals C and the differential signal terminal B in the first terminals 21 vertically correspond to the through-holes 503, the notches 501 and the penetration holes 504 in the middle shielding sheet 5, respectively. Thus, in the aforementioned insert molding process, a plurality of positioning pins of a mold may penetrate through the through-holes 503, the notches 501 and the penetration hole 504 to correspondingly urge against the grounding terminals A, the power supply terminals C and the differential signal terminals B, thus preventing the grounding terminals A, the power supply terminals C and the differential signal terminals B can be avoided from deformation and offset in the vertical direction caused by an impact from fused plastics in the molding process, and thereby accurately positioning various terminals on the insulating body 1. Specifically, a pair of positioning pins may be limited by a pair of penetration holes 504 not communicated with each other, thereby limiting an offset of the positioning pins corresponding to the differential signal terminals B in the left-right direction. Thus, the positioning pins can achieve more accurate positioning so as to urge against the differential signal terminals B, and the strength of the middle shielding sheet 5 is ensured.

2. The length of each penetration hole 504 in the front-rear direction is greater than the width thereof in the left-right direction. A row of first terminals 21 and a row of second terminals 31 are vertically and symmetrically arranged. Each row of the first terminals 21 and the second terminals 31 includes, sequentially from left to right as follows: a grounding terminal A, a pair of differential signal terminals (high-speed terminals) B for transmitting a USB 3.0 signal, a power supply terminal C, a reserved terminal, a pair of USB 2.0 terminals, a reserved terminal, a power supply terminal C, a pair of differential signal terminals (high-speed terminals) B for transmitting a USB 3.0 signal, and a grounding terminal A. Each penetration hole 504 vertically corresponds to one differential signal terminal B in the first terminals 21, thus reducing the shielding length of the middle shielding sheet 5 over the differential signal terminal B in the front-rear direction. Moreover, the length of the positioning pin urging against the differential signal terminal B in the front-rear direction can be adjusted. After demolding in the insert molding processing, a space for housing air will be formed at a place vertically and directly facing the positioning pin on the tongue 11. Such a structure may adjust the characteristic impedance of the differential signal terminal B to become stable, and reduce the insertion loss of the electrical connector assembly 100.

3. With the miniaturization of the electrical connector assembly 100, in the process of insert molding the first terminals 21 and the middle shielding sheet 5 into the insulating body 1, the positioning pins on a mold need to correspondingly penetrate through the through-holes 503, the notches 501 and the penetration holes 504 to urge against the grounding terminals A, the power supply terminals C and the differential signal terminals B. However, the positioning pins are very slender and low in strength so as to be easily broken in the molding process. Since the through-holes 503 and the notches 501 are located in front of the penetration holes 504, the positioning pins correspondingly penetrating through the through-holes 503, the notches 501 and the penetration holes 504 are staggered in the front-rear direction, so the space for housing the positioning pins is expanded, and the positioning pins can be thickened to make them stronger.

4. In certain embodiments of the present invention, first connection portions 211 of a row of first terminals 21 are first insert molded in an insulating block 22 to form a first terminal module 2, and then the first terminal module 2 and a middle shielding sheet 5 are insert molded together, so that the row of first terminals 21 is fixed as a whole. The insulating block 22 plays a role of holding the first terminal 21, free ends of the first terminals 21 can be prevented from warping or deflecting, the true position of the terminals is good, the risk of mutual contact of two adjacent first terminals 21 can be reduced. This also provides convenience for placing the entire row of first terminals 21 into a mold cavity when the first terminal module 2 and the middle shielding sheet 5 are insert molded together subsequently, so as to avoid that the terminal is damaged after being pressed or a mold is damaged when the first terminals 21 are clamped and positioned by positioning pin. Likewise, a row of second terminals 31 is insert molded in a plastic block 32, and free ends of the second terminals 31 can also be prevented from warping or deflecting, thereby preventing two adjacent second terminals 31 from contacting each other, so as to ensure the true position of the terminal.

5. In certain embodiments of the present invention, a molding manner includes insert molding both the middle shielding sheet 5 and a row of first terminals 21 into the tongue 11, and assembling a row of second terminals 31 to the lower surface of the insulating body 1. Compared with a manner in which both an upper row of terminals and a lower row of terminals are fixed to the tongue 11 in an assembly manner, the molding manner of the present invention can ensure the strength of the tongue 11 (because the tongue 11 needs to be thinned or slotted when the upper and lower terminal modules and the tongue 11 are assembled). Compared with a manner in which both an upper row of terminals and a lower row of terminals are fixed to the tongue 11 in an insert molding manner, the molding manner of the present invention can ensure that the terminals are stably held and are not damaged on the tongue 11 (because two molds are required to position an upper row of terminals and a lower row of terminals when the upper and lower terminal modules and the tongue 11 are bonded in an insert molding manner, and the molds easily damage the terminals after pressing in a second-time molding process). Meanwhile, production costs are reduced in the molding manner of the present invention.

6. In the electrical connector formed in the present invention, the insulating body 1 to which the first terminal module 2 is held and the plastic block 32 to which the second terminal module 3 is held are bonded together in an assembly manner. For these two elements bonded in an assembly and locking manner, the upper shielding sheet 6 is laminated to the upper surface of the insulating body 1, the lower shielding sheet 7 is laminated to the lower surface of the plastic block 32, and the upper shielding sheet 6 and the lower shielding sheet 7 are in a snap-fit connection to each other, so that the insulating body 1 and the plastic block 32 can be firmly fixed together, and are not easily separated.

7. The depressed portions 601 and 701 on the upper shielding sheet 6 and the lower shielding sheet 7 connect the electrical connector and the grounding line of the mating connector as a whole to implement the shielding function thereof, and can further prevent the mating connector from withdrawing from the insertion space of the electrical connector.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments are chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. An electrical connector, comprising:
   an insulating body;
   a plurality of terminals, insert molded into the insulating body, and comprising at least one grounding terminal, at least one power supply terminal and a pair of differential signal terminals located between one of the at least one grounding terminal and one of the at least one power supply terminal adjacent to the one of the at least one grounding terminal; and
   a middle shielding sheet, insert molded into the insulating body, and located above or below the multiple first terminals, wherein the middle shielding sheet is provided, on at least one side of a central line of the middle shielding sheet, with a notch and a first protruding portion away from the central line as compared to the notch, the central line extends in a front-rear direction, the notch is concavely provided backward from a front end edge of the middle shielding sheet and vertically corresponds to the power supply terminal, the first protruding portion has a through-hole vertically corresponding to one of the at least one grounding terminal, the middle shielding sheet is provided with a pair of penetration holes between the through-hole and the notch at a same side of the central line, the penetration holes are spaced from each other and vertically correspond to the pair of differential signal terminals.

2. The electrical connector of claim 1, wherein on the middle shielding sheet, the through-hole and the notch are located in front of the penetration holes.

3. The electrical connector of claim 1, wherein on the middle shielding sheet, a width of the notch in a left-right direction is greater than that of each of the penetration holes in the left-right direction.

4. The electrical connector of claim 1, wherein on the middle shielding sheet, a length of each of the penetration holes in the front-rear direction is greater than a width of each of the penetration holes in a left-right direction.

5. The electrical connector of claim 1, wherein on the middle shielding sheet, a length of each of the penetration holes in the front-rear direction is greater than a length of the notch in the front-rear direction and a length of the through-hole in the front-rear direction.

6. The electrical connector of claim 1, wherein the at least one grounding terminal protrudes forward beyond the differential signal terminals, and the through-hole is located in front of the differential signal terminals.

7. The electrical connector of claim 1, wherein:
   the middle shielding sheet has two notches, two first protruding portions, and two pairs of penetration holes respectively provided at two opposite sides of the central line, wherein each of the first protruding portions at each side of the central line is located away from the central line as compared to the corresponding notch, and each pair of the penetration holes at each side of the central line is provided between the corresponding notch and the corresponding first protruding portion;
   each through-hole vertically corresponds to one of the at least one grounding terminal;
   each notch vertically corresponds one power supply terminal; and
   each pair of penetration holes vertically corresponds to one pair of the differential signal terminals.

8. The electrical connector of claim 7, wherein a slot is concavely provided from each of two side edges of the middle shielding sheet, the penetration holes and the slot are arranged abreast in the left-right direction, and the through-hole is located in front of the slot.

9. The electrical connector of claim 7, wherein the two notches, the two through-holes and the two pairs of penetration holes are bilaterally symmetric to the central line, respectively.

10. The electrical connector of claim 7, wherein a second protruding portion is formed between the two notches, and the central line passes through the second protruding portion.

11. The electrical connector of claim 10, wherein a front end edge of the first protruding portion protrudes forward to a front end edge of the second protruding portion.

12. The electrical connector of claim 10, wherein the middle shielding sheet is provided with an opening located behind the second protruding portion, and four of the first terminals are provided between two of the power supply terminals and correspond to the opening in the vertical direction.

13. The electrical connector of claim 7, wherein a part of a left side edge of the middle shielding sheet is formed at a left side of a corresponding first protruding portion, and a part of a right side edge of the middle shielding sheet is formed at a right side of the corresponding first protruding portion.

14. The electrical connector of claim 1, wherein the insulating body has a base and a tongue extending forward from the base, the tongue has an upper surface and a lower surface oppositely arranged, each of the first terminals has a first contact portion exposed from the upper surface, and the through-hole, the notch and the penetration holes are embedded in the tongue, respectively.

15. The electrical connector of claim 14, wherein the middle shielding sheet has at least one first central line and at least one second central line respectively extending in the front-rear direction, the at least one first central line passes through a central point of a width of the through-hole in a left-right direction, the at least one second central line passes through a central point of a width of the notch in the left-right direction, and the pair of penetration holes is located between the at least one first central line and the at least one second central line adjacent to each other.

16. The electrical connector of claim 14, wherein the through-hole vertically corresponds to the first contact portion of the at least one grounding terminal, the notch vertically corresponds to the first contact portion of the at least one power supply terminal, and each of the penetration holes vertically corresponds to the first contact portion of each of the differential signal terminals.

17. The electrical connector of claim 14, wherein a plurality of positioning holes are concavely provided on the upper surface, and each of the positioning holes is located between two adjacent ones of the first terminals.

18. The electrical connector of claim 14, wherein two grooves are respectively concavely provided at two side edges of the tongue, two slots is respectively concavely provided at two side edges of the middle shielding sheet, and each of the two slots is exposed to a corresponding one of the two grooves.

19. The electrical connector of claim 14, further comprising a plurality of second terminals, each second terminal having a second contact portion installed on the lower surface, a second soldering portion exposed from the base, and a vertical segment vertically extending between the second contact portion and the second soldering portion, wherein each of the first terminals has a first soldering portion exposed from the base and a vertical segment vertically extending between the first contact portion and the first soldering portion, the middle shielding sheet has a main body in a rectangular shape along the front-rear direction and a bending portion bending downward from a rear end of the main body, the main body is located between the first contact portion and the second contact portion in the vertical direction, and the bending portion is located between the vertical segment of the first terminal and the vertical segment of the second terminal in the front-rear direction.

20. The electrical connector of claim 19, wherein the first terminals sequentially comprise, from left to right, a grounding terminal, a pair of differential signal terminals for transmitting a universal serial bus (USB) 3.0 signal, a power supply terminal, a reserved terminal, a pair of USB 2.0 terminals, a reserved terminal, a power supply terminal, a pair of differential signal terminals for transmitting the USB 3.0 signal, and a grounding terminal.

\* \* \* \* \*